United States Patent Office 2,899,137
Patented Aug. 11, 1959

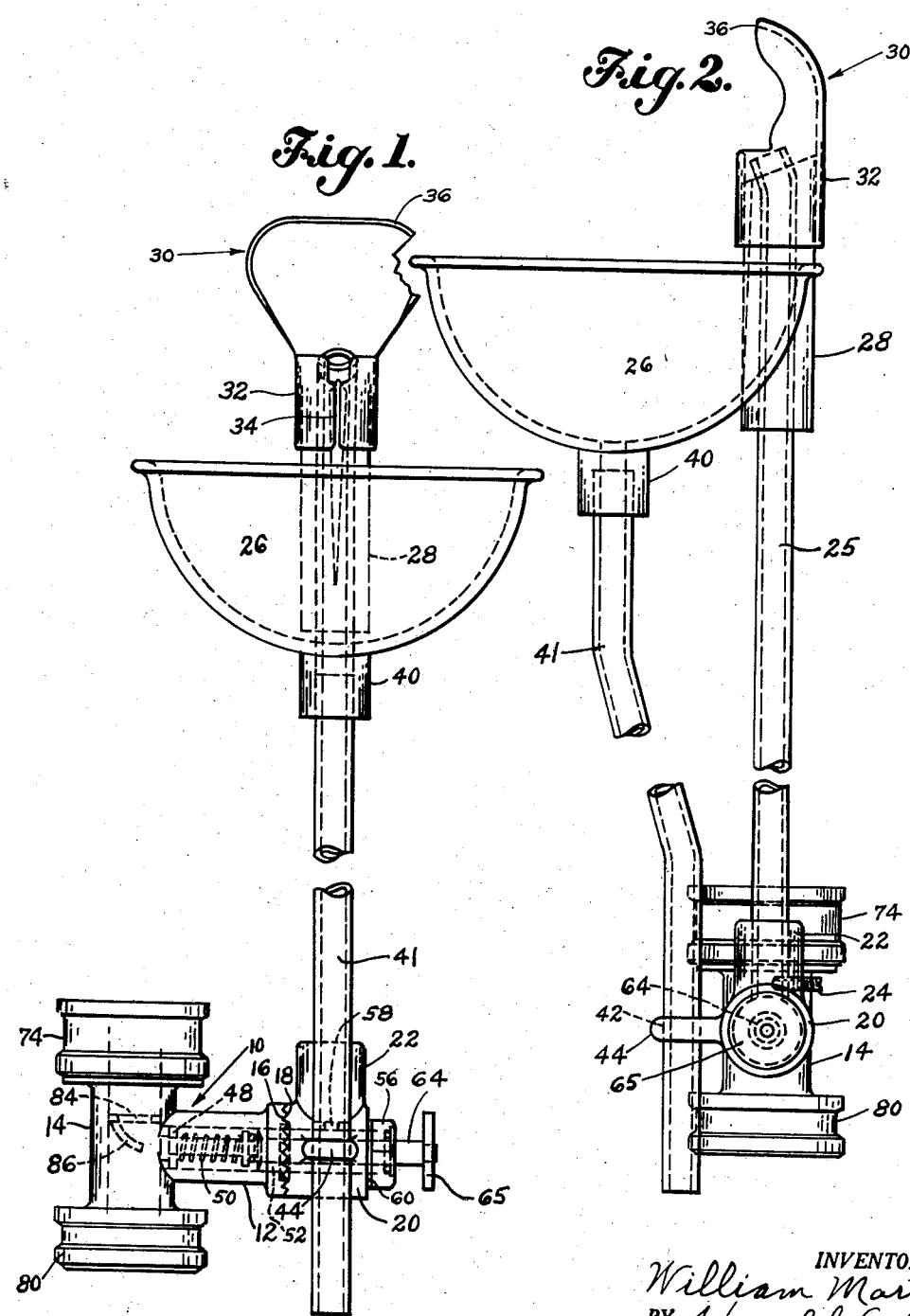

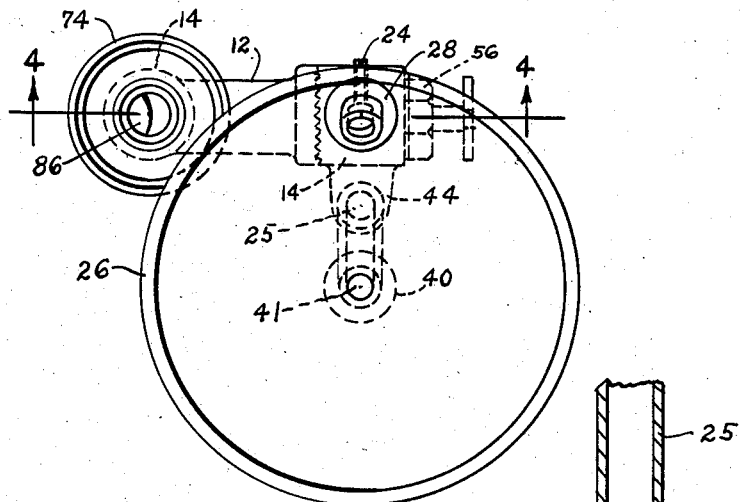
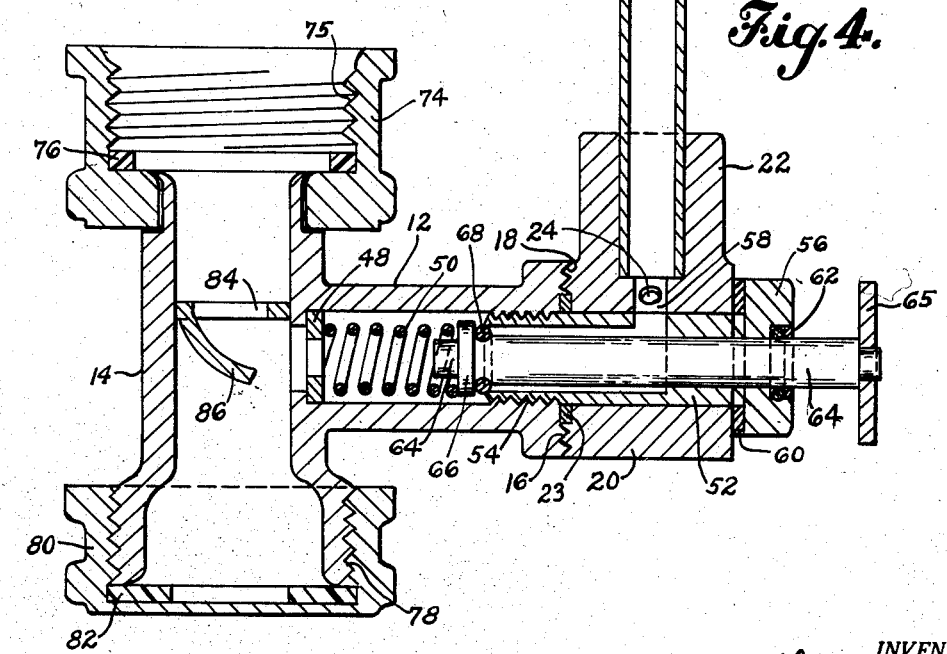

2,899,137

DRINKING FOUNTAIN WITH A CONNECTOR CONDUIT

William Martin, Arlington, Mass.

Application January 19, 1956, Serial No. 560,148

3 Claims. (Cl. 239—29)

This invention relates to a drinking fountain having a connector conduit whereby a hose or other attachment may also be supplied with water.

One object of my invention is to provide a drinking fountain that can be connected to a water faucet, especially an outdoor one, having bubbler apparatus conveniently located for drinking purposes, and which has a connector conduit whereby a hose or other attachment can be connected thereto, thus simultaneously providing both a drinking fountain and a water supply for a garden or the like.

Another object is to provide such a drinking fountain with adjustable means whereby the drinking fountain can be presented in the most advantageous position.

A further object is to provide such apparatus that is simple to assemble, easy to connect to a water faucet and a hose, and that is attractive in appearance.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

In the drawings:

Fig. 1 is a side elevational view of my drinking fountain with connector conduit.

Fig. 2 is a front elevational view thereof.

Fig. 3 is a top plan view thereof.

Fig. 4 is an enlarged, sectional view taken on the line 4—4 of Fig. 4, the valve being shown in closed or normal position.

As illustrated, my drinking attachment has a T-shaped connector conduit 10 having a leg part 12 with interior screw threads, and a cross part 14 eccentrically connected to and in communication with said leg part and ordinarily integral therewith. Said leg part 12 has gripping teeth 16 at one end which mesh with teeth 18 of a hollow fitting 20 that has a conduit extension 22. A washer 23 fits in recesses in said leg part 12 and fitting 20 which are just inwardly of said teeth 16 and 18. A small screw valve 24 screw-threadedly enters said fitting 20 at said extension 22, and may be inserted as far as desired to vary the flow of water in the fitting passage. A supply conduit 25 tightly fits into said extension 22, and extends therefrom upwardly in position of use, passing through a basin or bowl 26 near the outer edge thereof and terminating above it. Said bowl may be made of plastic or other suitable material. The upper part of said supply conduit 25 has a plastic covering 28.

Supported by said supply conduit 25 is a guard 30 that has a collar portion 32 which fits over said cover 28 and extends slightly beyond the outside end of said conduit. This collar portion 32 has a recess 34 therein to permit water to pass out through it. A shield portion 36 extends from and beyond said collar portion 32 to keep the drinker's mouth away from the outside end of said supply conduit 25. By having said collar portion 32 higher than the end of said supply conduit 25, a child would have difficulty in being able to hold his finger over the end thereof and squirt the water, while said recess 34 prevents the accumulation of water in said collar portion 32.

Said bowl 26 has a centrally located hole in which a collar 40 tightly fits and from the interior of this collar a drain pipe or conduit 41 extends irregularly downward in position of use, passing through a hole 42 in a bracket portion 44 extending laterally from the main body of said fitting 20. Within the interior of said leg part 12 is a washer 48 that rests adjacent said cross part 14, and against which one end of a coil spring 50 normally bears with some pressure.

Valve apparatus for my device includes a hollow valve housing 52, having exterior screw threads 54 at one end, and which extends laterally through said fitting 20 and enters and screw-threadedly connects with said leg part 12. A nut 56 is fixed to one end of said valve housing 52 and between said nut and said screw threads 54 the housing has a port 58 that communicates with the interior of said fitting extension 22.

A gasket 60 on said housing 52 bears against the outer edge of said fitting 20. Another washer 62 fits into a countersunk portion of the outside end of said valve housing nut 56. Slidable within said housing 52 is a valve stem 64 which is of such diameter that there is noticeable space between it and the interior of said valve housing 52 from the inner or screw threaded end of the latter to said port 58 whereby water may freely flow through said valve housing to said port 58. Said valve stem 64 has a reduced outside end on which a push button 65 is mounted. It also has a shoulder 66 thereon near its inner end, which end extends into said coil spring 50 until the latter bears against said shoulder. On the opposite side of the latter is a rubber washer 68 which closes the opening between said valve housing and said valve stem when the latter is in closed position as illustrated in Figs. 1 and 4. When said valve stem button 65 is pushed, the valve is opened by bringing said port 58 into communication with said fitting extension 22.

At one end of said cross part 14 is a feed portion embodying a swivel coupling 74 interiorly screw-threaded as at 75, and having the usual washer 76 therein to make a tight connection to a faucet. The opposite end provides a delivery or supply portion that is exteriorly screw-threaded as at 78, and a cover 80 is provided for it, when not in use, that is interiorly screw-threaded and within which is a washer 82. When desired, a hose or other distributor member, can be connected to this latter end.

Within said cross part 14 is a ring 84 which is pressed into position and from which a deflector 86 extends into the cross part passage that is opposite the passage in said leg part 12. While a hose is connected to said cross part 14, if the valve should be opened by pushing said valve stem 64 inwardly the liquid will more freely flow into said supply conduit 24 since said deflector 86 helps to direct it towards the passage in said leg part 12.

To adjust said supply conduit 25 and associated parts to any desired position, said nut 56 is loosened until the teeth 16 and 18 are clear of each other, thus permitting said fitting 20 to be rotated so as to present said conduit 25 in any desired position. Tightening of said nut 56 will firmly maintain said position.

What I claim is:

1. A fountain comprising a connector conduit embodying a leg part and a cross part in communication with said leg part, said leg part embodying teeth at one end, a hollow fitting communicating with said leg part and embodying teeth at one end adapted to mesh with said leg part teeth, valve apparatus operably supported by and in communication with said connector conduit and fitting embodying an adjustable member adapted to adjustably connect with said leg part whereby said teeth of said leg part and fitting may be separated, a supply conduit in communication with said fitting and with said valve apparatus when open, said connector conduit embodying a feed portion at one end adapted to be attached to a source of liquid supply.

2. A fountain comprising a connector conduit embodying a leg part and a cross part in communication with said leg part, said leg part embodying teeth at one end, a hollow conduit fitting communicating with said leg part embodying teeth at one end adapted to mesh with said leg part teeth, valve apparatus operably supported by and in communication with said connector conduit leg part, and in communication with said fitting, embodying a valve housing adapted to adjustably connect with said leg part whereby said teeth of said leg part and fitting may be separated and having a port in communication with said fitting, a valve stem movably extending into said valve housing and being spaced from the interior of said valve housing to thereby provide a passage for the flow of liquid in communication with said valve housing port, a supply conduit in communication with said fitting, said connector conduit embodying a feed portion at one end adapted to be attached to a source of liquid supply and a delivery portion at the opposite end adapted to be connected to a distributor member.

3. A fountain comprising a connector conduit embodying a leg part and a cross part in communication with said leg part, said leg part embodying teeth at one end, a hollow conduit fitting communicating with said leg part embodying a bracket portion having a hole therethrough and embodying teeth at one end adapted to mesh with said leg part teeth, valve apparatus operably supported by and in communication with said connector conduit and fitting embodying a valve housing adapted to adjustably connect with said leg part whereby said teeth of said leg part and fitting may be separated, and having a port in communication with said fitting, a valve stem movably extending into said valve housing and being spaced from the interior of said valve housing to thereby provide a passage for the flow of liquid in communication with said valve housing port, a supply conduit in communication with said fitting, said connector conduit embodying a feed portion at one end adapted to be attached to a source of liquid supply, a delivery portion at the opposite end adapted to be connected to a distributor member, a basin attached to said supply conduit, and a drain conduit in communication with said basin, and extending through said bracket portion hole.

References Cited in the file of this patent

UNITED STATES PATENTS

| | | |
|---|---|---|
| 1,069,910 | Taylor | Aug. 12, 1913 |
| 1,624,081 | Taylor | Apr. 12, 1927 |
| 1,875,283 | Trupiano | Aug. 30, 1932 |
| 2,423,069 | McElhose | June 24, 1947 |